US009390585B2

(12) United States Patent
Nelson et al.

(10) Patent No.: US 9,390,585 B2
(45) Date of Patent: Jul. 12, 2016

(54) GAMING SYSTEM AND METHOD FOR PROVIDING TEAM PLAY BENEFITS

(71) Applicant: IGT, Las Vegas, NV (US)

(72) Inventors: Dwayne R. Nelson, Las Vegas, NV (US); Steven G. Lemay, Reno, NV (US); Dwayne A. Davis, Reno, NV (US)

(73) Assignee: IGT, Las Vegas, NV (US)

( * ) Notice: Subject to any disclaimer, the term of this patent is extended or adjusted under 35 U.S.C. 154(b) by 140 days.

(21) Appl. No.: 13/944,510

(22) Filed: Jul. 17, 2013

(65) Prior Publication Data

US 2015/0024830 A1 Jan. 22, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3244* (2013.01); *G07F 17/3267* (2013.01); *G07F 17/3272* (2013.01); *G07F 17/3274* (2013.01)

(58) Field of Classification Search

CPC ............ G07F 17/3244; G07F 17/3272; G07F 17/3274

See application file for complete search history.

(56) References Cited

U.S. PATENT DOCUMENTS

| | | | |
|---|---|---|---|
| 4,926,327 | A | 5/1990 | Sidley |
| 5,046,736 | A | 9/1991 | Bridgeman et al. |
| 5,078,405 | A | 1/1992 | Jones et al. |
| 5,275,400 | A | 1/1994 | Weingardt et al. |
| 5,280,909 | A | 1/1994 | Tracy |
| 5,283,734 | A | 2/1994 | Von Kohorn |
| 5,324,041 | A | 6/1994 | Boylan et al. |
| 5,326,104 | A | 7/1994 | Pease et al. |
| 5,344,144 | A | 9/1994 | Canon |
| 5,511,781 | A | 4/1996 | Wood et al. |
| 5,542,669 | A | 8/1996 | Charron et al. |
| 5,544,892 | A | 8/1996 | Breeding |
| 5,564,700 | A | 10/1996 | Celona |
| 5,564,701 | A | 10/1996 | Dettor |
| 5,580,311 | A | 12/1996 | Haste, III |
| 5,584,485 | A | 12/1996 | Jones et al. |
| 5,611,535 | A | 3/1997 | Tiberio |
| 5,645,486 | A | 7/1997 | Nagao et al. |
| 5,655,961 | A | 8/1997 | Acres et al. |
| 5,697,844 | A | 12/1997 | Von Kohorn |

(Continued)

FOREIGN PATENT DOCUMENTS

| | | | |
|---|---|---|---|
| EP | 1 175 928 | | 1/2002 |
| WO | WO 0032286 | A1 | 6/2000 |

(Continued)

*Primary Examiner* — Kevin Y Kim

(74) *Attorney, Agent, or Firm* — Neal, Gerber & Eisenberg LLP

(57) ABSTRACT

A gaming system and method which forms, tracks and maintains one or more groups, teams or pools of players. Each group, team or pool includes one or more players (i.e., team members). A player's participation or involvement with the group or team enables the player to access one or more benefits otherwise not available to players unaffiliated with the group or team. That is, based on a player's association with a formed group or team, the gaming system provides the player with one or more benefits, such as an award, an opportunity to win an award, or a modified probability of winning an award.

20 Claims, 5 Drawing Sheets

(56) References Cited

U.S. PATENT DOCUMENTS 5,702,304 A 12/1997 Acres et al.
5,713,795 A 2/1998 Von Kohorn
5,741,183 A 4/1998 Acres et al.
5,743,798 A 4/1998 Adams et al.
5,749,784 A 5/1998 Clapper, Jr.
5,752,882 A 5/1998 Acres et al.
5,766,076 A 6/1998 Pease et al.
5,772,509 A 6/1998 Weiss
5,779,547 A 7/1998 SoRelle et al.
5,779,549 A 7/1998 Walker et al.
5,816,918 A 10/1998 Kelly et al.
5,820,459 A 10/1998 Acres et al.
5,830,063 A 11/1998 Brune
5,836,817 A 11/1998 Acres et al.
5,851,149 A 12/1998 Xidos et al.
5,855,515 A 1/1999 Pease et al.
5,876,283 A 3/1999 Parra et al.
5,876,284 A 3/1999 Acres et al.
5,885,158 A 3/1999 Torango et al.
5,890,963 A 4/1999 Yen
5,916,024 A 6/1999 Von Kohorn
5,947,820 A 9/1999 Morro et al.
5,951,011 A 9/1999 Potter et al.
5,957,775 A 9/1999 Cherry
5,984,779 A * 11/1999 Bridgeman et al. ............ 463/16
5,997,002 A 12/1999 Goldman
6,001,016 A 12/1999 Walker et al.
6,008,784 A 12/1999 Acres et al.
6,015,344 A 1/2000 Kelly
6,019,374 A 2/2000 Breeding
6,039,648 A 3/2000 Guinn et al.
6,056,289 A 5/2000 Clapper, Jr.
6,065,752 A 5/2000 Beltran
6,077,162 A 6/2000 Weiss
6,089,980 A 7/2000 Gauselmann
6,110,041 A 8/2000 Walker et al.
6,110,043 A 8/2000 Olsen
6,142,872 A 11/2000 Walker et al.
6,146,273 A 11/2000 Olsen
6,162,122 A 12/2000 Acres et al.
6,165,071 A 12/2000 Weiss
6,179,710 B1 1/2001 Sawyer et al.
6,206,782 B1 3/2001 Walker et al.
6,210,275 B1 4/2001 Olsen
6,217,448 B1 4/2001 Olsen
6,224,482 B1 5/2001 Bennett
6,224,485 B1 5/2001 Dickinson et al.
6,231,445 B1 5/2001 Acres
6,241,608 B1 6/2001 Torango
6,244,958 B1 6/2001 Acres
6,254,483 B1 7/2001 Acres
6,257,981 B1 7/2001 Acres et al.
6,264,555 B1 7/2001 Glazman et al.
6,287,197 B1 9/2001 Dickinson et al.
6,296,569 B1 10/2001 Congello, Jr.
6,299,534 B1 10/2001 Breeding et al.
6,311,976 B1 11/2001 Yoseloff et al.
6,312,332 B1 11/2001 Walker et al.
6,312,333 B1 11/2001 Acres
6,315,668 B1 11/2001 Metke
6,319,122 B1 11/2001 Packes, Jr. et al.
6,319,125 B1 11/2001 Acres
6,334,614 B1 1/2002 Breeding
6,336,862 B1 1/2002 Brune
6,358,149 B1 3/2002 Schneider et al.
6,364,768 B1 4/2002 Acres et al.
6,364,965 B1 4/2002 Masuda et al.
6,371,852 B1 4/2002 Acres
6,375,567 B1 4/2002 Acres
6,375,568 B1 4/2002 Roffman et al.
6,375,569 B1 4/2002 Acres
6,390,916 B1 5/2002 Brown
6,406,372 B1 6/2002 Turmell et al.
6,416,409 B1 7/2002 Jordan
6,431,983 B2 8/2002 Acres
6,435,511 B1 8/2002 Vancura et al.
6,435,968 B1 8/2002 Torango
6,439,995 B1 8/2002 Hughs-Baird et al.
6,450,887 B1 9/2002 Mir et al.
RE37,885 E 10/2002 Acres et al.
6,471,591 B1 10/2002 Crumby
6,488,505 B1 12/2002 Hightower
6,503,146 B2 1/2003 Walker et al.
6,508,709 B1 1/2003 Karmarkar
6,527,271 B2 3/2003 Soltys et al.
6,540,607 B2 4/2003 Mokris et al.
6,554,283 B2 4/2003 Vancura et al.
6,563,523 B1 5/2003 Suchocki et al.
6,565,434 B1 5/2003 Acres
6,565,435 B2 5/2003 Metke
6,575,832 B1 6/2003 Manfredi et al.
6,579,181 B2 6/2003 Soltys et al.
6,585,592 B1 7/2003 Crumby
6,592,459 B2 7/2003 Parra et al.
6,592,460 B2 7/2003 Torango
6,595,854 B2 7/2003 Hughs-Baird et al.
6,599,193 B2 7/2003 Baerlocher et al.
6,605,003 B2 8/2003 Suchocki et al.
6,607,438 B2 8/2003 Baerlocher et al.
6,607,441 B1 8/2003 Acres
6,609,973 B1 8/2003 Weiss
6,620,046 B2 9/2003 Rowe
6,626,758 B1 9/2003 Parham et al.
6,632,141 B2 10/2003 Webb et al.
6,638,167 B1 10/2003 Sawyer et al.
6,648,753 B1 11/2003 Tracy et al.
6,652,378 B2 11/2003 Cannon et al.
6,656,047 B1 12/2003 Tarantino et al.
6,656,048 B2 12/2003 Olsen
6,676,512 B2 1/2004 Fong et al.
6,692,005 B2 2/2004 Vancura et al.
6,692,353 B2 2/2004 Walker et al.
6,692,354 B2 2/2004 Tracy et al.
6,695,695 B2 2/2004 Angel
6,699,124 B2 3/2004 Suchocki
6,709,330 B1 3/2004 Klein et al.
6,712,697 B2 3/2004 Acres
6,749,510 B2 6/2004 Giobbi
6,755,420 B2 6/2004 Colton
6,755,654 B2 6/2004 Hightower
6,758,748 B2 7/2004 Byrne
6,780,111 B2 8/2004 Cannon et al.
6,800,030 B2 10/2004 Acres
6,814,664 B2 11/2004 Baerlocher et al.
6,824,135 B2 11/2004 Stancik
6,832,958 B2 12/2004 Acres et al.
6,835,132 B2 12/2004 Bennett
6,837,788 B2 1/2005 Cannon
6,837,793 B2 1/2005 McClintic
6,843,724 B2 1/2005 Walker et al.
6,846,238 B2 1/2005 Wells
6,869,076 B1 3/2005 Moore et al.
6,878,063 B2 4/2005 Manfredi et al.
6,884,167 B2 4/2005 Walker et al.
6,887,154 B1 5/2005 Luciano, Jr. et al.
6,910,964 B2 6/2005 Acres
6,923,440 B2 8/2005 Cherry
6,932,340 B1 8/2005 Schaefer et al.
6,932,701 B2 8/2005 Glavich et al.
RE38,812 E 10/2005 Acres et al.
7,018,292 B2 3/2006 Tracy et al.
7,025,674 B2 4/2006 Adams et al.
7,040,982 B1 5/2006 Jarvis et al.
7,056,211 B2 6/2006 Taltavull et al.
7,070,505 B2 7/2006 Vancura et al.
7,077,746 B2 7/2006 Torango
7,097,562 B2 8/2006 Gagner
7,169,041 B2 1/2007 Tessmer et al.
7,182,689 B2 2/2007 Hughs-Baird et al.
7,273,415 B2 9/2007 Cregan et al.
7,311,598 B2 12/2007 Kaminkow et al.
7,311,604 B2 12/2007 Kaminkow et al.
7,351,140 B2 4/2008 Wolf et al.
7,354,342 B2 4/2008 Paulsen et al.

(56) References Cited

U.S. PATENT DOCUMENTS

| | | | |
|---|---|---|---|
| 7,357,716 | B2 | 4/2008 | Marks et al. |
| 7,371,174 | B2 | 5/2008 | Baerlocher |
| 7,377,849 | B2 | 5/2008 | Baerlocher et al. |
| 7,390,263 | B1 | 6/2008 | Acres |
| 7,393,280 | B2 | 7/2008 | Cannon |
| 7,419,429 | B2 | 9/2008 | Taylor |
| 7,427,236 | B2 | 9/2008 | Kaminkow et al. |
| 7,448,949 | B2 | 11/2008 | Kaminkow et al. |
| 8,012,014 | B2 | 9/2011 | Low et al. |
| 8,092,297 | B2 | 1/2012 | Decasa et al. |
| 2001/0034643 | A1 | 10/2001 | Acres |
| 2001/0034649 | A1 | 10/2001 | Acres |
| 2001/0046891 | A1 | 11/2001 | Acres |
| 2001/0055990 | A1 | 12/2001 | Acres |
| 2002/0010015 | A1 | 1/2002 | Acres |
| 2002/0014821 | A1 | 2/2002 | Kobayashi et al. |
| 2002/0061778 | A1 | 5/2002 | Acres |
| 2002/0138594 | A1* | 9/2002 | Rowe ............................ 709/219 |
| 2002/0151342 | A1 | 10/2002 | Tracy et al. |
| 2002/0177483 | A1 | 11/2002 | Cannon |
| 2002/0183105 | A1 | 12/2002 | Cannon et al. |
| 2002/0198044 | A1 | 12/2002 | Walker et al. |
| 2003/0001338 | A1 | 1/2003 | Bennett et al. |
| 2003/0027625 | A1 | 2/2003 | Rowe |
| 2003/0028480 | A1 | 2/2003 | Rowe |
| 2003/0036429 | A1 | 2/2003 | Witty et al. |
| 2003/0045350 | A1 | 3/2003 | Baerlocher et al. |
| 2003/0060266 | A1 | 3/2003 | Baerlocher |
| 2003/0060279 | A1 | 3/2003 | Torango |
| 2003/0090063 | A1 | 5/2003 | Jarvis et al. |
| 2003/0092484 | A1 | 5/2003 | Schneider et al. |
| 2003/0104860 | A1 | 6/2003 | Cannon et al. |
| 2003/0119579 | A1* | 6/2003 | Walker et al. ................... 463/20 |
| 2003/0125107 | A1 | 7/2003 | Cannon |
| 2003/0144965 | A1 | 7/2003 | Prasad et al. |
| 2003/0157978 | A1 | 8/2003 | Englman |
| 2003/0186733 | A1 | 10/2003 | Wolf et al. |
| 2003/0211880 | A1 | 11/2003 | Locke |
| 2003/0216166 | A1 | 11/2003 | Baerlocher et al. |
| 2003/0222402 | A1 | 12/2003 | Olive |
| 2003/0228904 | A1 | 12/2003 | Acres et al. |
| 2003/0236116 | A1 | 12/2003 | Marks et al. |
| 2004/0009811 | A1 | 1/2004 | Torango |
| 2004/0048644 | A1 | 3/2004 | Gerrard et al. |
| 2004/0072615 | A1 | 4/2004 | Maya et al. |
| 2004/0174366 | A1 | 9/2004 | Lenger et al. |
| 2004/0204235 | A1 | 10/2004 | Walker et al. |
| 2004/0242297 | A1 | 12/2004 | Walker |
| 2004/0242320 | A1 | 12/2004 | Jackson |
| 2005/0020340 | A1 | 1/2005 | Cannon |
| 2005/0020342 | A1 | 1/2005 | Palmer et al. |
| 2005/0026671 | A1 | 2/2005 | Baerlocher |
| 2005/0026674 | A1 | 2/2005 | Wolf et al. |
| 2005/0032573 | A1 | 2/2005 | Acres et al. |
| 2005/0037845 | A1 | 2/2005 | Rozkin et al. |
| 2005/0043088 | A1 | 2/2005 | Nguyen et al. |
| 2005/0054435 | A1 | 3/2005 | Rodgers et al. |
| 2005/0064932 | A1 | 3/2005 | Cannon |
| 2005/0101374 | A1 | 5/2005 | Acres |
| 2005/0101384 | A1 | 5/2005 | Parham |
| 2005/0119047 | A1 | 6/2005 | Olive |
| 2005/0143168 | A1 | 6/2005 | Torango |
| 2005/0153767 | A1 | 7/2005 | Gauselmann |
| 2005/0176488 | A1 | 8/2005 | Olive |
| 2005/0176494 | A1 | 8/2005 | Thomas |
| 2005/0187014 | A1 | 8/2005 | Saffari et al. |
| 2005/0209004 | A1 | 9/2005 | Torango |
| 2005/0209005 | A1 | 9/2005 | Acres et al. |
| 2005/0239542 | A1 | 10/2005 | Olsen |
| 2006/0003829 | A1 | 1/2006 | Thomas |
| 2006/0019747 | A1 | 1/2006 | Loose et al. |
| 2006/0025195 | A1 | 2/2006 | Pennington et al. |
| 2006/0030403 | A1 | 2/2006 | Lafky et al. |
| 2006/0035705 | A1 | 2/2006 | Jordon |
| 2006/0040723 | A1 | 2/2006 | Baerlocher et al. |
| 2006/0040724 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046822 | A1 | 3/2006 | Kaminkow et al. |
| 2006/0052160 | A1 | 3/2006 | Saffari et al. |
| 2006/0068893 | A1 | 3/2006 | Jaffe et al. |
| 2006/0073897 | A1 | 4/2006 | Englman et al. |
| 2006/0079316 | A1 | 4/2006 | Flemming et al. |
| 2006/0079317 | A1 | 4/2006 | Flemming et al. |
| 2006/0084495 | A1 | 4/2006 | Jaffe et al. |
| 2006/0084496 | A1 | 4/2006 | Jaffe et al. |
| 2006/0089194 | A1 | 4/2006 | Joshi et al. |
| 2006/0089196 | A1 | 4/2006 | Parham et al. |
| 2006/0094495 | A1 | 5/2006 | Gelber et al. |
| 2006/0116194 | A1 | 6/2006 | Pacey et al. |
| 2006/0121969 | A1 | 6/2006 | Marks et al. |
| 2006/0121971 | A1 | 6/2006 | Slomiany et al. |
| 2006/0142079 | A1 | 6/2006 | Ikehara et al. |
| 2006/0160612 | A1 | 7/2006 | Parham et al. |
| 2006/0160625 | A1 | 7/2006 | Englman et al. |
| 2006/0172804 | A1 | 8/2006 | Acres et al. |
| 2006/0178203 | A1 | 8/2006 | Hughes et al. |
| 2006/0183529 | A1 | 8/2006 | Acres et al. |
| 2006/0183532 | A1 | 8/2006 | Jackson |
| 2006/0183535 | A1 | 8/2006 | Marks et al. |
| 2006/0189369 | A1 | 8/2006 | Taylor |
| 2006/0211472 | A1 | 9/2006 | Walker et al. |
| 2006/0211473 | A1 | 9/2006 | Walker et al. |
| 2006/0211474 | A1 | 9/2006 | Walker et al. |
| 2006/0211484 | A1 | 9/2006 | Hornik et al. |
| 2006/0217171 | A1 | 9/2006 | Roireau |
| 2006/0217176 | A1 | 9/2006 | Walker et al. |
| 2006/0217188 | A1 | 9/2006 | Walker et al. |
| 2006/0240892 | A1 | 10/2006 | Walker et al. |
| 2006/0247006 | A1 | 11/2006 | Inamura |
| 2007/0004494 | A1 | 1/2007 | Taylor |
| 2007/0010322 | A1 | 1/2007 | Walker et al. |
| 2007/0015571 | A1 | 1/2007 | Walker et al. |
| 2007/0024005 | A1 | 2/2007 | Snow |
| 2007/0026924 | A1 | 2/2007 | Taylor |
| 2007/0032301 | A1 | 2/2007 | Acres et al. |
| 2007/0054726 | A1 | 3/2007 | Muir et al. |
| 2007/0054728 | A1 | 3/2007 | Hood |
| 2007/0054732 | A1 | 3/2007 | Baerlocher |
| 2007/0054733 | A1 | 3/2007 | Baerlocher |
| 2007/0060271 | A1 | 3/2007 | Cregan et al. |
| 2007/0060314 | A1 | 3/2007 | Baerlocher et al. |
| 2007/0060320 | A1 | 3/2007 | Kelly et al. |
| 2007/0060321 | A1 | 3/2007 | Vasquez et al. |
| 2007/0060332 | A1 | 3/2007 | Anderson et al. |
| 2007/0077990 | A1 | 4/2007 | Cuddy et al. |
| 2007/0087823 | A1 | 4/2007 | Walker et al. |
| 2007/0093288 | A1 | 4/2007 | Walker et al. |
| 2007/0105613 | A1 | 5/2007 | Adams et al. |
| 2007/0105619 | A1 | 5/2007 | Kniesteadt et al. |
| 2007/0105620 | A1 | 5/2007 | Cuddy et al. |
| 2007/0106553 | A1 | 5/2007 | Jordan et al. |
| 2007/0111786 | A1 | 5/2007 | Snow |
| 2007/0149292 | A1 | 6/2007 | Kaminkow et al. |
| 2007/0155485 | A1 | 7/2007 | Cuddy et al. |
| 2007/0167208 | A1 | 7/2007 | Acres |
| 2007/0167217 | A1 | 7/2007 | Kaminkow et al. |
| 2007/0184887 | A1 | 8/2007 | Cannon |
| 2007/0191088 | A1 | 8/2007 | Breckner et al. |
| 2007/0202943 | A1 | 8/2007 | Thomas |
| 2007/0207847 | A1 | 9/2007 | Thomas |
| 2007/0218975 | A1 | 9/2007 | Iddings et al. |
| 2007/0218982 | A1 | 9/2007 | Baerlocher |
| 2007/0218983 | A1 | 9/2007 | Lombardo |
| 2007/0243923 | A1 | 10/2007 | Seelig et al. |
| 2007/0254734 | A1 | 11/2007 | Gilmore et al. |
| 2007/0259706 | A1 | 11/2007 | Anderson et al. |
| 2007/0259713 | A1 | 11/2007 | Fiden et al. |
| 2007/0265060 | A1 | 11/2007 | Hornik et al. |
| 2007/0265092 | A1 | 11/2007 | Betteridge |
| 2007/0293308 | A1 | 12/2007 | Jackson et al. |
| 2007/0298856 | A1 | 12/2007 | Gilmore et al. |

(56) References Cited

U.S. PATENT DOCUMENTS

| | | | |
|---|---|---|---|
| 2007/0298874 | A1 | 12/2007 | Baerlocher et al. |
| 2007/0298875 | A1 | 12/2007 | Baerlocher et al. |
| 2008/0004104 | A1 | 1/2008 | Durham et al. |
| 2008/0004105 | A1 | 1/2008 | Cregan et al. |
| 2008/0015004 | A1 | 1/2008 | Gatto et al. |
| 2008/0020817 | A1 | 1/2008 | Kaminkow et al. |
| 2008/0020822 | A1 | 1/2008 | Cuddy et al. |
| 2008/0020823 | A1 | 1/2008 | Cuddy et al. |
| 2008/0020824 | A1 | 1/2008 | Cuddy et al. |
| 2008/0020825 | A1 | 1/2008 | Cuddy et al. |
| 2008/0020829 | A1 | 1/2008 | Baerlocher |
| 2008/0020830 | A1 | 1/2008 | Ikehara et al. |
| 2008/0020831 | A1 | 1/2008 | Ikehara et al. |
| 2008/0020832 | A1 | 1/2008 | Iddings et al. |
| 2008/0020833 | A1 | 1/2008 | Baerlocher et al. |
| 2008/0020834 | A1 | 1/2008 | Breckner et al. |
| 2008/0020846 | A1 | 1/2008 | Vasquez et al. |
| 2008/0020847 | A1 | 1/2008 | Kniesteadt et al. |
| 2008/0026812 | A1 | 1/2008 | Smith et al. |
| 2008/0039191 | A1 | 2/2008 | Cuddy |
| 2008/0045341 | A1 | 2/2008 | Englman |
| 2008/0051168 | A1 | 2/2008 | Kaminkow et al. |
| 2008/0051194 | A1 | 2/2008 | Parham et al. |
| 2008/0058092 | A1 | 3/2008 | Schwartz et al. |
| 2008/0058096 | A1 | 3/2008 | Parham et al. |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0070702 | A1 | 3/2008 | Kaminkow et al. |
| 2008/0076496 | A1 | 3/2008 | Baerlocher et al. |
| 2008/0076514 | A1 | 3/2008 | Baerlocher et al. |
| 2008/0076515 | A1 | 3/2008 | Baerlocher et al. |
| 2008/0076517 | A1 | 3/2008 | Baerlocher et al. |
| 2008/0076527 | A1 | 3/2008 | Low et al. |
| 2008/0076531 | A1 | 3/2008 | Baerlocher et al. |
| 2008/0076532 | A1 | 3/2008 | Graham et al. |
| 2008/0076534 | A1 | 3/2008 | Iddings et al. |
| 2008/0076542 | A1 | 3/2008 | Iddings et al. |
| 2008/0076543 | A1 | 3/2008 | Parham et al. |
| 2008/0076552 | A1 | 3/2008 | Baerlocher et al. |
| 2008/0076576 | A1 | 3/2008 | Graham et al. |
| 2008/0081690 | A1 | 4/2008 | Baerlocher et al. |
| 2008/0081691 | A1 | 4/2008 | Baerlocher et al. |
| 2008/0085771 | A1 | 4/2008 | Iddings et al. |
| 2008/0085772 | A1 | 4/2008 | Iddings et al. |
| 2008/0090651 | A1 | 4/2008 | Baerlocher |
| 2008/0096640 | A1 | 4/2008 | Bennett et al. |
| 2008/0096645 | A1 | 4/2008 | Frerking et al. |
| 2008/0102916 | A1 | 5/2008 | Kovacs et al. |
| 2008/0102920 | A1 | 5/2008 | Baerlocher |
| 2008/0102942 | A1 | 5/2008 | Parham et al. |
| 2008/0102943 | A1 | 5/2008 | Parham et al. |
| 2008/0106037 | A1 | 5/2008 | Smith et al. |
| 2008/0108401 | A1 | 5/2008 | Baerlocher et al. |
| 2008/0108410 | A1 | 5/2008 | Baerlocher |
| 2008/0108423 | A1 | 5/2008 | Benbrahim et al. |
| 2008/0108426 | A1 | 5/2008 | Nguyen et al. |
| 2008/0108430 | A1 | 5/2008 | Evans |
| 2008/0108431 | A1 | 5/2008 | Cuddy et al. |
| 2008/0111308 | A1 | 5/2008 | Snow |
| 2008/0113699 | A1 | 5/2008 | Stevens et al. |
| 2008/0113706 | A1 | 5/2008 | O'halloran |
| 2008/0113738 | A1 | 5/2008 | Vallejo et al. |
| 2008/0113765 | A1 | 5/2008 | Dewaal |
| 2008/0113768 | A1 | 5/2008 | Baerlocher |
| 2008/0113771 | A1 | 5/2008 | Baerlocher et al. |
| 2008/0113779 | A1 | 5/2008 | Cregan |
| 2008/0113784 | A1 | 5/2008 | Vallejo et al. |
| 2008/0139274 | A1 | 6/2008 | Baerlocher |
| 2008/0139290 | A1 | 6/2008 | Kniesteadt et al. |
| 2008/0139316 | A1 | 6/2008 | He et al. |
| 2008/0146322 | A1 | 6/2008 | Hardy et al. |
| 2008/0146323 | A1 | 6/2008 | Hardy et al. |
| 2008/0146325 | A1 | 6/2008 | Walker et al. |
| 2008/0146344 | A1 | 6/2008 | Rowe et al. |
| 2008/0146345 | A1 | 6/2008 | Hardy et al. |
| 2008/0146346 | A1 | 6/2008 | Hardy et al. |
| 2008/0153564 | A1 | 6/2008 | Baerlocher et al. |
| 2008/0167114 | A1 | 7/2008 | Graham |
| 2008/0167123 | A1 | 7/2008 | Luciano et al. |
| 2008/0176647 | A1 | 7/2008 | Acres |
| 2008/0176650 | A1 | 7/2008 | Wolf et al. |
| 2008/0182638 | A1 | 7/2008 | Paulsen et al. |
| 2008/0182650 | A1 | 7/2008 | Randall et al. |
| 2008/0182655 | A1 | 7/2008 | Dewaal et al. |
| 2008/0207298 | A1 | 8/2008 | Marks et al. |
| 2008/0207304 | A1 | 8/2008 | Acres |
| 2008/0207312 | A1 | 8/2008 | Seelig et al. |
| 2008/0207313 | A1 | 8/2008 | Acres |
| 2008/0214292 | A1 | 9/2008 | Bryant et al. |
| 2008/0220848 | A1 | 9/2008 | Adiraju et al. |
| 2008/0234047 | A1 | 9/2008 | Nguyen |
| 2008/0248867 | A1 | 10/2008 | Englman et al. |
| 2008/0268935 | A1 | 10/2008 | Acres |
| 2008/0268959 | A1 | 10/2008 | Bryson et al. |
| 2008/0293473 | A1 | 11/2008 | Fiden et al. |
| 2009/0005165 | A1 | 1/2009 | Arezina et al. |
| 2009/0011823 | A1 | 1/2009 | Englman et al. |
| 2009/0011824 | A1 | 1/2009 | Englman et al. |
| 2009/0011826 | A1 | 1/2009 | Acres |
| 2009/0124363 | A1 | 5/2009 | Baerlocher et al. |
| 2010/0137056 | A1 | 6/2010 | Hoffman et al. |
| 2011/0111843 | A1 | 5/2011 | Nicely et al. |
| 2012/0083338 | A1 | 4/2012 | Decasa et al. |

FOREIGN PATENT DOCUMENTS

| | | | |
|---|---|---|---|
| WO | WO 0115055 | A1 | 3/2001 |
| WO | WO 0151143 | A1 | 7/2001 |
| WO | WO 2005015826 | | 2/2005 |
| WO | WO 2005016471 | A1 | 2/2005 |
| WO | WO 2006063054 | A2 | 6/2006 |
| WO | WO 2006104731 | A2 | 10/2006 |
| WO | WO 2007082336 | A1 | 7/2007 |
| WO | WO 2007089410 | A2 | 8/2007 |
| WO | WO 2008143790 | A2 | 11/2008 |

* cited by examiner

GAMING SYSTEM AND METHOD FOR PROVIDING TEAM PLAY BENEFITS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

In recent years, gaming has become a more social leisure activity. Gaming establishments often strive for ways to enable players to work together in gaming. Working together creates camaraderie among the players and provides an enhanced gaming experience. Certain secondary or bonus games include a group gaming aspect wherein a plurality of players participate in a group bonus game for one or more bonus awards.

Accordingly, there is a continuing need to provide new bonus games which include a group gaming aspect, wherein a plurality of players playing at linked gaming machines cooperate together for one or more bonus awards.

SUMMARY

In various embodiments, the gaming system and method disclosed herein forms, tracks, and maintains one or more groups, teams, or pools of players. In these embodiments, each group, team, or pool includes one or more players (i.e., team members). In these embodiments, a player's participation or involvement with the group or team enables the player to access one or more benefits or features otherwise not available to players unaffiliated with the group or team. In other words, based on a player's association with a formed group or team, the gaming system provides the player with one or more benefits or features, such as an award, an opportunity to win an award, or a modified or enhanced probability of winning an award. Put differently, the gaming system avails one or more players associated with a group or team with certain group or team benefits or features while the gaming system prevents one or more players not associated with the group or team from accessing the group or team benefits or features. Such a configuration thus encourages players to join one or more groups or teams to receive such group or team benefits.

In various embodiments, one or more groups, teams, or pools are associated with one or more eligibility qualifications. In certain of these embodiments, the gaming system determines, based on such eligibility qualifications, whether a player qualifies to be a member of a team. In certain of these embodiments, the gaming system additionally or alternatively determines, based on such eligibility qualifications, whether a player on a team qualifies to remain a member of that team. For example, the gaming system determines, based on a player's wagering activity over a designated period of time, whether that player qualifies to become a member of a team and/or whether that player continues to qualify to remain a member of a team.

In certain embodiments, the gaming system determines whether to provide a player a wagering benefit or feature based on whether the player is a member of a team. The gaming system of such embodiments enable the different individual players of a team to combine their collective wagering activity to collectively benefit each of the members of the team. In one such embodiment, when a player is not associated with any teams, the gaming system enables the player to place a first wager amount on a first play of a game, wherein the first play of the game is associated with a first paytable having a first average expected payback percentage. In this embodiment, when the player is associated with a team, the gaming system enables the player to place the same first wager amount on a second play of the game, wherein the second play of the game is associated with a second, different paytable having a second, greater average expected payback percentage. For example, when a player is not a member of a team, if that player or a non team member wagers $1.00 on a first primary game, the gaming system utilizes a first paytable having a 92% average expected payback percentage, and if the non-team member wagers $5.00 on a second primary game, the gaming system utilizes a second paytable having a 95% average expected payback percentage. In this example, when the player is a member of a team with at least four other players, the gaming system enables each of the at least five players of the team to wager $1 to play the first primary game to utilize the second paytable having the 95% average expected payback percentage (which is utilized for the higher denomination wager amount). As illustrated in this example, the gaming system teats or characterizes the five individual $1 wagers as a collective $5 wager and provides each of the individual players the benefit of accessing the second paytable as if they were each wagering $5.

In various embodiments, a player's association or affiliation with a group, team or pool avails that player of certain benefits or features not otherwise available to the player (if that player were not associated or affiliated with the group, team or pool). In such embodiments, the gaming system causes one or more benefits or features, such as an opportunity to win an otherwise unavailable award, a utilization of a more lucrative paytable or an opportunity to play an otherwise unavailable game, to become available to members of a team, while remaining unavailable to non-members of the team. That is, the gaming system of such embodiments enable the different individual players of a team to combine their collective game play activity to collectively benefit each of the members of the team.

In one such embodiment, upon an occurrence of a suitable triggering event, the gaming system determines, based on a player's involvement with a team, whether or not to combine the collective individual game play activities of a plurality of players to benefit each of players. In this embodiment, if a team triggering event occurs and a player is not associated with any teams, the gaming system does not display any bonus event (or not make an otherwise unavailable benefit available) in association with the occurrence of the team triggering event. On the other hand, if the team triggering event occurs and the player is associated with a team, the gaming system displays a bonus event (or makes an otherwise unavailable benefit available) in association with the occurrence of the team triggering event. Such a configuration provides an additional incentive to players to join and remain a member of a team which further increases the level of excitement and enjoyment of certain players.

In other such embodiments, the gaming system determines whether to provide a player a benefit or feature based on one or more activities of one or more of the players of a team. For example, if each of the players of a team remain associated with a team for a designated period of time, such as by each player maintaining a designated wagering level for the designated period of time, the gaming system provides a benefit to one or more of the members of the team. In this example, the gaming system informing the players of the team of the amount of time until the designated period of time is reached creates a situation wherein one or more players of the team will encourage one or more other players of the team to remain affiliated with the team to preserve the award winning potential of the different members of the team.

Accordingly, the gaming system and method disclosed herein enables players to work together as a team to share in one or more benefits or features. Such a team concept enable players to feel in control as the join or create teams with friends and family (or with new friends) and share in the joy of winning together.

Additional features and advantages are described in, and will be apparent from, the following Detailed Description and the figures.

DETAILED DESCRIPTION

Pooled Game Play

In various embodiments, the gaming system disclosed herein relates generally to providing one or more groups, teams, or pools of one or more players, wherein a player's participation or involvement with the group, pool or team (for brevity referred to herein as a team) enables the player to access one or more benefits otherwise not available to players unaffiliated with the group or team.

While certain of the embodiments described below are directed to providing a benefit associated with a primary or base game, it should be appreciated that one or more of such benefits may additionally or alternatively be employed in association with a secondary or bonus game. Similarly, while certain of the embodiments described below are directed to providing a benefit associated with a secondary or bonus game, it should be appreciated that one or more of such benefits may additionally or alternatively be employed in association with a primary or base game. Moreover, while the player's credit balance, the player's wager, and any awards are displayed as an amount of monetary credits or currency in certain of the embodiments described below, one or more of such players credit balance, such player's wager, and any awards provided to such a player may be for non-monetary credits, promotional credits, and/or player tracking points or credits.

Figure 1:
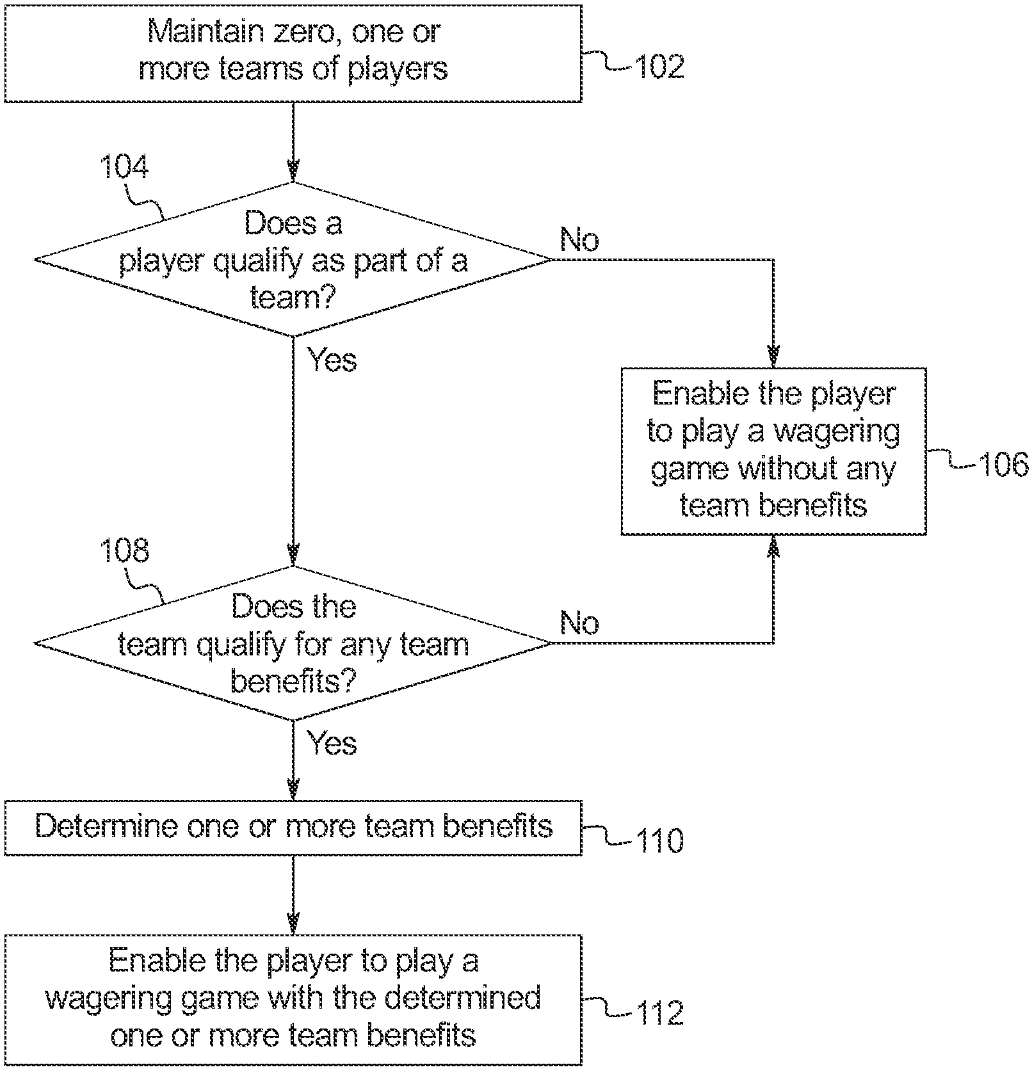
FIG. 1 is a flow chart an example process for operating a gaming system providing a team benefit as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In operation of one embodiment of the gaming system disclosed herein, the gaming system maintains zero, one or more teams or groups of players as indicated in block 102 of FIG. 1. Each team includes one or more players (i.e., team members) affiliated with the team. As described below, each team is subject to zero, one or more rules pertaining to the formation of the team and any ongoing maintenance or qualifications of the team.

In one embodiment, in addition to maintaining zero, one or more teams or groups of players, the gaming system determines if a player qualifies as part of a team as indicated in diamond 104 of FIG. 1. In one embodiment, the gaming system determines, at designated intervals, such as prior to a gaming session, after an elapsed period of time or prior to one or more plays of one or more games, if the player qualifies as part of the team. That is, the gaming system of this embodiment periodically determines if a player team qualification event occurs in association with one or more players playing one or more games. In one embodiment, a player qualifies to be part of a team based on a displayed event associated with a play of a game. In another embodiment, a player qualifies to be part of a team based on an event independent of any displayed event associated with a play of a game.

In one embodiment, a player qualifies as part of a team (and/or qualifies to remain a member of a team) based on whether that player that is actively associated with or actively belongs to a team. In this embodiment, a player is actively associated with or actively belongs to a team based on one or more player qualifications associated with the team. For instance, a player is actively associated with a team if that player made one or more inputs to belong to the team and the player placed a wager on a game within a predetermined period of time or a rolling period of time. Other factors in determining whether a player is actively associated with a team include, but are not limited to, (a) the amount of time between each play of or wager on a primary game; (b) the amount being wagered on one or more primary games; (c) the number of plays within a period of time, such as a rolling period of time; (d) the player not being actively associated with another team; (e) the player being logged into the gaming system (such as via a player tracking system); (f) the player winning a designated award within a designated time period; and (g) the player not leaving, such as to take a break or to leave the gaming establishment. For example, a team or pool has a designated play rate, wherein to qualify for the team and subsequently remain qualified for the team, the gaming system requires the player to maintain a minimum wagering level over a period of time, such as requiring the player to place a wager (or a wager above a designated amount) and play a game four times per minute. In another example, the team or pool has an idle time limit wherein if the player is inactive for a designated period of time, such as one minute, the gaming system disqualifies or otherwise removes the player from the team. It should be appreciated that any suitable manner of determining whether a player actively belongs to a team and/or remains affiliated with the team may be implemented in accordance with the gaming system disclosed herein.

If the gaming system determines that the player does not qualify as a member of a team, the gaming system enables the player to play a wagering game without any team benefits as indicated in block 106. That is, if the player fails to qualify as a member of a team (i.e., the player's team qualification activity falls below a designated player team qualification threshold), the gaming system does not enable that player to access any of the benefits available to any qualifying members of the team.

On the other hand, if the gaming system determines that the player qualifies as a member of a team, the gaming system determines if the team qualifies for any team benefits as indicated in diamond 108. Put differently, if a player qualifies as a member of a team, the gaming system proceeds to determine if a team benefit qualification event occurs in association with one or more qualified players playing one or more games. In one embodiment, a team qualifies for one or more team benefits based on one or more displayed events associated with one or more plays of a game by one or more of the qualified players of the team. In another embodiment, a team qualifies for one or more team benefits based on one or more events which occur independent of any displayed event associated with any plays of any games by any of the qualified players of the team.

In one embodiment, a team qualifies for a team benefit (and/or remains qualified for a team benefit) based on the collective activity of the qualified members of the team. For instance, a team qualifies for a team benefits if the collective members of the team have made one or more inputs and collectively placed a designated quantity of wagers (or designated total wager amount) within a predetermined period of time or a rolling period of time. Other factors in determining whether a team qualifies for any team benefit include, but are not limited to, (a) the collective amount of time or one or more individual member's amount of time between each play of or wager on a primary game for the members of the team; (b) the collective amount or one or more individual member's amount being wagered on one or more primary games for the members of the team; (c) the collective number of plays or one or more individual member's number of plays within a period of time for the members of the team; (d) one, more or each of the collective members of the team being logged into the gaming system (such as via a player tracking system); (e) the collective members of the team or one or more individual members of the team winning a designated award within a designated time period; and (f) the collective members of the team or one or more individual members of the team not leaving, such as to take a break or to leave the gaming establishment. For example, a team or pool has a play rate, wherein to remain qualified for the team benefit, the gaming system requires the collective members of the team maintain a minimum wagering level over a period of time. It should be appreciated that any suitable manner of determining whether a team qualifies for a team benefit and/or remains qualified for a team benefit may be implemented in accordance with the gaming system disclosed herein.

If the gaming system determines that the team does not qualify for a team benefit, the gaming system returns to block 106 and enables the player to play a wagering game without any team benefits. That is, even if a player qualifies for a team, if the collective activity of the team fails to qualify the team for the benefit (i.e., the collective activity of the team falls below a designated team qualification threshold), the gaming system does not enable that player to access any of the benefits available to any qualifying members of other, qualifying teams.

On the other hand, if the gaming system determines that the team qualifies for a team benefit, the gaming system determines one or more team benefits as indicated in block 110.

In one embodiment, the determined team benefit is a wagering benefit. In this embodiment, the gaming system enables the different individual players of the team to pool or combine their collective wagering activity to collectively benefit each of the members of the team. For example, if a team includes four players and the gaming system enables each player to, absent any team benefit, individually play a $0.25 game with a 90% average expected payback percentage, the determined team benefit includes the gaming system enabling each player to individually play a $0.25 game with the same 92% average expected payback percentage associated with any non-team member playing at $1.00 per game. Accordingly, in this example, each of the team members receive the team benefit of utilizing, for the cost of a $0.25 game, the higher average expected payback percentage associated with the more expensive $1.00 game.

In another embodiment wherein the determined team benefit is a wagering benefit, the gaming system enables the different individual players of the team to pool or combine their collective wagering activity to collectively benefit each of the members of the team to wager an amount and/or denomination otherwise not available to be wagered. For example, if a team includes ten players and the gaming system enables each player to, absent any team benefit, individually place a maximum wager of $3 to play a game with a 94% average expected payback percentage, the determined team benefit includes the gaming system enabling each player to individually place a maximum wager of $5 to play a game with the same 96% average expected payback percentage associated with any non-team member playing at $5.00 per game. Accordingly, in this example, a player's affiliation with a team enables a player to utilize a paytable associated with a wager amount and/or denomination otherwise not available to the player.

In another embodiment, the determined benefit includes utilizing a different paytable than the paytable utilized if the player were not a qualifying member of a team that qualifies for the team benefit. In one such embodiment, the different paytable include different awards and/or different probabilities of winning such awards.

In another embodiment, the determined benefit includes triggering or unlocking one or more features otherwise unavailable to the player (if the player were not a qualifying member of a team that qualifies for the team benefit). In different embodiments, the gaming system selects such feature(s) from the group of features including, but not limited to:

(i) a book-end wild symbols feature;
(ii) a stacked wild symbols feature;
(iii) an expanding wild symbols feature;
(iv) a wild reel feature;
(v) a retrigger symbol feature;
(vi) an anti-terminator symbol feature;
(vii) a locking reel feature,
(viii) a locking symbol position feature;
(ix) a modification of an amount of credits of a credit balance;
(x) a modification of an amount of promotional credits;
(xi) a modification of a placed wager amount;
(xii) a modification of a wager amount available to be placed;
(xiii) a modification of a placed side wager amount;
(xiv) a modification of a side wager amount available to be placed;
(xv) a modification of a rate of earning player tracking points,
(xvi) a modification of a number of wagered on paylines;
(xvii) a modification of a number of paylines available to be wagered on;
(xviii) a modification of a wager placed on one or more paylines (or on one or more designated paylines);
(xix) a modification of a number of ways to win wagered on;
(xx) a modification of a number of available ways to win to be wagered on;
(xxi) a modification of a wager placed on one or more ways to win (or on one or more designated ways to win);
(xxii) a modification of a paytable utilized for a play of a game;
(xxiii) an application of a modifier, such as a multiplier or an additional quantity of credits, to one or more awards of a paytable utilized for a play of a game,
(xxiv) a modification of an average expected payback percentage of a play of a game;
(xxv) a modification of an average expected payout of a play of a game;
(xxvi) a modification of one or more awards available;
(xxvi) a modification of a range of awards available;
(xxviii) a modification of a type of awards available;
(xxix) a modification of one or more progressive awards;
(xxx) a modification of which progressive awards are available to be won;
(xxxi) a modification of one or more modifiers, such as multipliers, available;
(xxxii) a modification of an activation of a reel (or a designated reel);
(xxxiii) a modification of an activation of a plurality of reels;
(xxxiv) a modification of a generated outcome (or a designated generated outcome);
(xxxv) a modification of a generated outcome (or a designated generated outcome) associated with an award over a designated value;
(xxxvi) a modification of a generated outcome (or a designated generated outcome) on a designated payline;
(xxxvii) a modification of a generated outcome (or a designated generated outcome) in a scatter configuration;
(xxxviii) a modification of a winning way to win (or a designated winning way to win);
(xxxix) a modification of a designated symbol or symbol combination;
(xl) a modification of a generation of a designated symbol or symbol combination on a designated payline;
(xli) a modification of a generation of a designated symbol or symbol combination in a scatter configuration;
(xlii) a modification of a triggering event of a play of a secondary or bonus game;
(xliii) a modification of an activation of a secondary or bonus display (such as an award generator);
(xliv) a modification of an activation of a community award generator;
(xlv) a modification of a generated outcome (or a designated generated outcome) in a secondary game;
(xlvi) a modification of an amount of free spins provided;
(xlvii) a modification of a game terminating or ending condition;
(xlviii) a modification of how one or more aspects of one or more games (e.g., colors, speeds, sound) are displayed to a player;
(xlix) a modification of access to different websites a team member may access via a mobile device;
(l) a modification of audio-visual content a team member may access via a mobile device
(li) a modification of any game play feature associated with any play of any game disclosed herein;
(lii) a modification of a player's avatar;
(liii) a play of any suitable slot game;
(liv) a play of any suitable free spins or free game activations;
(lv) a play of any suitable wheel game;
(lvi) a play of any suitable card game;
(lvii) a play of any suitable offer and acceptance game;
(lviii) a play of any suitable award ladder game;
(lix) a play of any suitable puzzle-type game;
(lx) a play of any suitable persistence game;
(lxi) a play of any suitable selection game;
(lxii) a play of any suitable cascading symbols game;
(lxiii) a play of any suitable ways to win game;
(lxiv) a play of any suitable scatter pay game;
(lxv) a play of any suitable coin-pusher game;
(lxvi) a play of any suitable elimination game;
(lxvii) a play of any suitable stacked wilds game;
(lxviii) a play of any suitable trail game;
(lxix) a play of any suitable bingo game;
(lxx) a play of any suitable video scratch-off game;
(lxxi) a play of any suitable pick-until-complete game;
(lxxii) a play of any suitable shooting simulation genie;
(lxxiii) a play of any suitable racing game;
(lxxiv) a play of any suitable promotional game;
(lxxv) a play of any suitable high-low game;
(lxxvi) a play of any suitable lottery game;
(lxxvii) a play of any suitable number selection game;
(lxxviii) a play of any suitable dice game;
(lxxix) a play of any suitable skill game;
(lxxx) a play of any suitable auction game;
(lxxxi) a play of any suitable reverse-auction game;
(lxxxii) a play of any suitable group genie;
(lxxxiii) a play of any suitable game in a service window;
(lxxxiv) a play of any suitable game on a mobile device;
(lxxxv) and/or
(lxxxvi) a play of any other suitable type of game.

In one embodiment, the gaming system determines the team benefit based on the quantity of qualifying players on the team. In another embodiment, the gaming system determines the team benefit based on the rate of play of one or more players on the team. In another embodiment, the gaming system determines the team benefit based on the duration such qualifying players have remained on the team. In this embodiment, the longer a team remains qualified for a team benefit, the more lucrative the team benefit becomes (i.e., a team benefit does not reach a full benefit immediately, but requires an event or time period to reach the full benefit). For example, if a game played by an individual non-team member has a 90% average expected payback percentage and the same game played at the same wager level by an individual team member has a 92% average expected payback percentage (i.e., a full team benefit of an increased 2% average expected payback percentage), the gaming system gradually increases the average expected payback percentage of the game the longer the team remains qualified for the team benefit. In this example, for a first level (such as a first duration of time after the team qualifies for the team benefit, until a first amount of wagers are collectively wagered by the members of the team or until a first game event or quantity of first game events occur), the average expected payback percentage of the game is 90.5%, and for a second level (such as a second duration of time after the first duration of time concluded, until a second amount of wagers are collectively wagered by the members of the team or until a second game event or quantity of second game events occur), the average expected payback percentage of the game is 91.0%. In this example, the gaming system provides appropriate messages such as "CONGRATULATIONS" and "THE TEAM HAS REACHED A SECOND LEVEL OF GAME PLAY AND THE AVERAGE EXPECTED PAYBACK PERCENTAGE HAS INCREASED TO 91%" to the players visually, or through suitable audio or audiovisual displays. It should be appreciated that in these embodiments, different quantities of players, different durations of qualification and/or different rates of play influence the determined team benefit and thus influence the volatility and average expected payout of the player's gaming experience.

Following the determination of the team benefit, the gaming system proceeds to block 112 and enables the player to play a wagering game with the determined one or more team benefits. That is, if a player qualifies for a team and if the collective activity of the team qualifies the team for the benefit (i.e., the collective activity of the team at least equals a designated team qualification threshold), the gaming system modifies one or more aspects of the player's gaming experience by providing the player the determined team benefit.

In one embodiment, the gaming system causes at least one display device of a player's electronic gaming machine ("EGM") to display the team benefits afforded to one or more members of a team. In another embodiment, in addition or in alternative to each EGM displaying such team benefits, the gaming system causes one or more community or overhead display devices to display part or all of the team benefits afforded to one or more members of the team to one or more other players or bystanders either at a gaming establishment or viewing over a network, such as the internet. In one such embodiment, the gaming system utilizes one or more community or overhead display devices to display the different team benefits associated with the different teams to encourage one or more players to join a team.

In one such embodiment, one or more teams are associated with a leader-board (displayed on a display device of an EGM, displayed on a community display, and/or displayed via a service window) which displays which teams have won certain amounts, which teams have available openings for new players to join, how the players of one or more teams are otherwise playing one or more games, and/or the qualification status of one or more members of one or more teams. In another such embodiment, a team is associated with a leader-board (displayed on a display device of an EGM, displayed on a community display, and/or displayed via a service window) which ranks how the different members of a team have played during a designated period of time. For example, the gaming system ranks one or more players based on how often they leave a team or how long they remain actively qualified for a team. Such information might influence new players regarding which teams to join and which teams to avoid.

In another embodiment, in addition or in alternative to each EGM displaying such team benefits, the gaming system causes one or more internet sites to each display the team benefits such that a player is enabled to log on from a personal web browser. In another such embodiment, the gaming system enables the player to play one or more primary games on one device while viewing the team benefits from another device. For example, the gaming system enables the player to play one or more primary games on a mobile phone while viewing the status of the team benefits on a desktop or laptop computer.

In one embodiment, the gaming system displays information pertaining to the obtained team benefits of the different members of the team. In one such embodiment, the gaming system displays to the team members the amount of additional awards won by the player for being a member of the team. For example, the gaming system provides appropriate messages such as "YOU HAVE WON AN ADDITIONAL $4.25 FOR BEING A MEMBER OF THE TEAM" or "ALL MEMBERS OF THE TEAM HAVE WON AN ADDITIONAL $25.50 FOR BEING PART OF THE TEAM" to the players visually, or through suitable audio or audiovisual displays.

In another embodiment, the gaming system displays information pertaining to the player qualification status of different members of the team. For example, if a member of a team indicates they wish to leave the team or is in jeopardy of being disqualified from the team, such as failing to maintain a minimum level of game play, the gaming system displays such information to other members of the team. In one such embodiment, the gaming system provides the members of the team with the ability to socialize and communicate via their respective game interfaces. This embodiment enables players to not only communicate about the winnings of the team but also to warn/encourage others to remain on the team so that all of the players on the team may collectively win more awards. Continuing with the example from above, if the gaming system displays information to one or more team members pertaining to another member of the team indicating they wish to leave the team or being in jeopardy of being disqualified from the team, such players may encourage the player to stay or increase their level of game play to remain on the team such that the other members of the team receive additional awards.

In another embodiment which includes displaying information to the different members of a team, the gaming system provides a team award to one or more members of a team after a designated period of time, such as after one hour of game play. For example, the gaming system informs a team member that they may win an additional $4.25 for remaining qualified for the team in fifty-five minutes. In this example, if each of the players remain qualified on the team for the specified period (or until a specified event occurs), the gaming system provides such players one or more additional awards, wherein if any one or more players leave or otherwise fail to remain qualified for the team, no additional award is provided to any of the players. In such an example, one or more players may encourage other players to remain qualified for the team to preserve the potential winnings of the team as a whole (e.g., a first player may inform another player not to leave because they are about to win an additional $4.25 based on the collective team play). In different embodiments, the gaming system displays, on a portion of the display device, on a separate display device and/or in a service window, the level of game play or activity of other members of the team, such as a listing of other team members and a graphical display of their wagering activity, to inform a team member which other team members may be close to being disqualified. In these embodiments, the gaming system enables the team member to select a name, icon or avatar associated with the other team members to communicate with the other team member, such as by sending an automatic prompt or message, to encourage the other team member to remain qualified.

In another embodiment, the gaming system enables one or more members of a team to share in a determined team benefit. In one embodiment, each of the members of a team share the determined team benefit equally or substantially equally. In one embodiment, each of the members of a team share the determined team benefit based on any suitable criteria of the members of the team. In one such embodiment, the members of a team share the determined team benefit based on each member's relative amount of wagering activity since joining the team. In another such embodiment, the members of a team share the determined team benefit based on each member's relative amount of game play activity since joining the team. In another such embodiment, the members of a team share the determined team benefit based on each member's relative amount of awards won since joining the team. In one embodiment, the team benefit includes an availability of a progressive award wherein the gaming system provides the players who join the team the opportunity to win a progressive award (or another level of a multiple level progressive award configuration) which is otherwise not available. In this embodiment, the gaming system splits the team benefit progressive award amongst the players on the team.

In one embodiment, to form one or more teams and/or assign one or more players to one or more teams, the gaming system monitors one or more gaming events occurring and/or the identification of one or more players. In this embodiment, the gaming system analyzes such data and determines if any players are eligible to join one or more of the maintained teams or groups of players. Accordingly, in these embodiments, the gaming system tracks and maintains the teams, which players currently belong to which teams (i.e., which players are currently actively associated with which teams) and each player of each team wagering activity and/or gaming activity on a real-time or near real-time basis.

In one embodiment, the gaming system forms, tracks and maintains at least one default group or team and enables one or more of the players to register for or join the default group or team. In another embodiment, the gaming system forms, tracks and maintains a plurality of groups or teams and enables each player the opportunity to select which of the groups or teams to register for or join.

In another embodiment, the gaming system enables one or more players to create and identify or name their own private group or team which is tracked and maintained by the gaming system. In this embodiment, the gaming system enables one or more players to selectively invite other players to join this created private group or team.

In one such embodiment, the gaming system enables players to designate team members at the gaming machine or at a bank of gaming machine. In this embodiment, the gaming system prompts the player(s) to identify team member based on where the other team members are sitting at the bank of gaming machines or based on which of the gaming machines are active gaming machines. In another such embodiment, the gaming system enables one or more players to input or otherwise communicate to the gaming system a list of other players to form a group or team. In another such embodiment, the gaming system enables players to require a password for other players to join a created private group or team. For example, a player may create a private team and invite a group of friends who only want to play together to join. In different embodiments, a player is enabled to set up a team or group and/or join a team or group via an EGM, a device connected to a data network, such as an internet, a player tracking device, a service window, a kiosk or any other suitable manner. It should be appreciated that enabling players to input a list of other players to create a team and providing benefits to players of the teams provides a dynamic that the more players on a designated player's list (and the more players on a team), the more frequently that the designated player is provided such a benefit.

In one embodiment, the gaming system enables players at different locations or gaming establishments to form a team. In another embodiment, the gaming system additionally or alternatively enables players using different gaming mediums (i.e., a player playing a game at a gaming establishment and a player playing a game online via a web browser) to form a team. In another embodiment, the gaming system enables players to form a team associated with a designated charity or other common cause (wherein part or all of the additional awards available for being a member of such a team are donated to the charity of other common cause). In another embodiment, the gaming system additionally or alternatively enables players playing different games to form a team. In another embodiment, the gaming system enables a gaming establishment to form, track and maintain one or more private teams for a convention and invite people attending the convention to join these private teams or groups.

In one embodiment, the gaming system assigns a plurality of players to a team based on one or more rules or parameters pertaining to forming one or more teams. In one such embodiment, the gaming system assigns different players to different groups based on their respective status or player tracking levels (such as determined through a player tracking system). For example, the gaming system assigns gold level players to one team and platinum level players to another team. In another example, each team may include a designated number of gold level players, a designated number of silver level players and a designated number of platinum level players. In another such embodiment, the gaming system assigns different players to different groups based on the wagering activity of the players (i.e., based on an amount each player wagers over a designated period of time or over a rolling period of time). In another such embodiment, the gaming system assigns different players to different groups based on an average wager amount over a designated period of time or over a rolling period of time of each player. In another such embodiment, the gaming system assigns different players to different groups based on a denomination each player is wagering.

In one embodiment, the gaming system assigns players to different teams or groups based on any suitable team parameters or characteristics, such as a current quantity of players on a team compared to a minimum quantity of players per team or a maximum quantity of players per team. In another embodiment, the gaming system assigns players to different teams or groups based on any suitable player characteristic which is categorized in one or more databases. In another embodiment, the gaming system assigns players to different teams or groups based on any suitable gaming activity. In one such embodiment, the gaming system assigns players to different teams or groups based on a denomination or wager amount which the player is currently wagering. In another such embodiment, the gaming system assigns players to different teams or groups based on a rate of play which the player is currently playing one or more games.

In another embodiment, the gaming system assigns players to different teams or groups based on the type of game they are playing. For example, the gaming system assigns players currently playing poker games to one team and players currently playing keno games to another team. In this example, the gaming system may cause the team benefit to be associated with the type of game being played by the members of the team, such as a team of players playing a slot game are afforded a team benefit of an additional slot wild symbols and a team of players playing a poker game are afforded a team benefit of an additional joker or wild card in the poker deck. In another example, the gaming system provides that a team is limited to a game type such as slots, poker, keno or bingo. In another embodiment, the gaming system assigns players to different teams or groups based on the theme of the game they are playing.

In another embodiment, the gaming system assigns players to different teams or groups independent of the game or type of game they are playing. In one such embodiment, while the gaming system enables players that are playing different games to join the same team, the gaming system offers customizations to players of a team that are playing a particular game or game theme.

In another embodiment, the gaming system assigns players to different teams or groups based on the paytable utilized in association with the game they are playing. In another embodiment, the gaming system assigns players to different teams or groups based on the type of gaming apparatus they are playing. For example, the gaming system assigns players currently playing games at EGMs to one team and players currently playing games at gaming tables to another team. In a multi-property embodiment, the gaming system assigns players to a team based on their respective locations.

It should be appreciated that any suitable method of assigning one or more players to one or more teams may be implemented in accordance with the gaming system disclosed herein.

In one embodiment, the gaming system enables a player to concurrently belong to or be associated with a plurality of teams or groups at the same time. In this embodiment, the gaming system enables a player, at any designated time, to be actively associated with or actively belong to one team or group (i.e., the player is eligible receive a team benefit for that team along with the other members of the team) and also inactively associated with or passively belong to zero, one or more additional teams or groups (i.e., the player is ineligible to receive a team benefit for that team along with the other members of the team). For example, at a designated point in time, a first player may be actively associated with a first team or group (and thus eligible to receive a first team benefit), inactively associated with a second team or group (and thus ineligible to receive a second team benefit) and inactively associated with a third team or group (and thus ineligible to receive a third team benefit).

In one alternative embodiment, the gaming system enables a player to actively belong to or be associated with a plurality of teams or groups at the same time. That is, in this alternative embodiment, the gaming system enables a player, at any given time, to be concurrently actively associated with or actively belong to a plurality of teams or groups (i.e., the player is eligible to receive a plurality of team benefits with the other members of the team).

In another such embodiment, the gaming system enables a player to utilize a plurality of player tracking cards to actively belong to or be associated with a plurality of teams or groups at the same time. In this embodiment, the gaming system enables one player tracking card associated with the player to be actively associated with a first team and another player tracking card also associated with the player to be actively associated with a second team. For example, if a player is currently playing two EGMs and the player has inputted a separate player tracking card into each EGM, the gaming system enables the player's wagers at a first of the EGMs (tracked via the player's first player tracking card) to qualify the player for a first team benefit of a first team and concurrently enables the player's wagers at a second of the EGMs (tracked via the player's second player tracking card) to qualify the player for a second team benefit of a second team.

In one alternative embodiment, the gaming system maintains one or more teams or groups for all carded members of a gaming establishment's player tracking club. In this embodiment, the gaming system enables all carded members to belong to one or more teams or groups and play for such team benefits. In another embodiment, the gaming system maintains one or more teams or groups for all players currently playing EGMs in the gaming system (i.e., a player tracking card is not required to belong to a team or group).

In another embodiment, a qualification for a team benefit occurs based on different triggers for different teams. For example, qualification for a team benefit for a first team occurs based on an amount of time the players of the team have been playing. In this example, qualification for a team benefit for a second team occurs based on one or more players winning one or more outcomes.

In one embodiment, the gaming system enables a player to switch to any maintained team or group in the gaming system. In another embodiment, the gaming system enables a player to switch to a plurality, but not all, of the maintained teams or groups in the gaming system. In another embodiment, the gaming system prohibits the player from switching teams. In this embodiment, the gaming system first disqualifies a player from a first team and then enables the player to qualify for a second team.

In another embodiment, the gaming system enables a player to exchange their portion of a team benefit in one team for a portion of a team benefit in a different team. In one such embodiment, a player exchanges a portion of a team benefit in one team for another player's portion of the team benefit in another team. In another such embodiment, a player exchanges a portion of a team benefit in one team with the gaming system for a portion of a team benefit of another team. In this embodiment, the gaming system includes one or more exchange rates for exchanging or converting portions of team benefits in one team with portions of team benefits in another team.

In one embodiment, any player actively playing an EGM may exchange a portion of a team benefit in one team for a portion of a team benefit in another team. In another embodiment, some but not all of the players actively playing EGMs may exchange a portion of a team benefit in one team for a portion of a team benefit in another team.

In one embodiment, one or more players are enabled to purchase a portion of a team benefit in one or more teams from the gaming system. In one embodiment, any player actively playing an EGM may purchase a portion of a team benefit in one or more teams. In another embodiment, some but not all of the players actively playing EGMs may purchase a portion of a team benefit in one or more teams.

In one embodiment, the gaming system enables a player to defer or delay utilizing any obtained team benefit. In this embodiment, the gaming system enables the player to escrow or save any obtained team benefit for a team or group, wherein part or all of the player's escrowed obtained team benefit is carried over and applied to the team or group at a later time. In another embodiment, any stored or escrowed team benefit for one or more teams are associated with a time period for usage. Such stored team benefits for one or more teams may be associated with a time of day, certain day(s) of week, a month and/or a year which they can be used. In another embodiment, stored team benefits for one or more teams are associated with an expiration date and time. In this embodiment, the gaming system communicates to the player the proximity of the expiration of any stored team benefits in one or more teams.

In one embodiment, as mentioned above, a player team qualification event and/or a team benefit qualification event occurs, based on an outcome associated with one or more plays of any primary game and/or an outcome associated with one or more plays of any secondary game of the EGMs in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a player team qualification event and/or a team benefit qualification event occurs to occur.

In another embodiment, as also mentioned above, the gaming system does not provide any apparent reasons to the players for a player team qualification event and/or a team benefit qualification event to occur. In these embodiments, such determinations are not triggered by an event in a primary game or based specifically on any of the plays of any primary game or on any of the plays of any secondary game of the EGMs in the system. That is, these events occur without any explanation or alternatively with simple explanations.

In one embodiment, a player team qualification event and/or a team benefit qualification event occurs, based on an amount of coin-in. In this embodiment, the gaming system determines if an amount of coin-in wagered at one or more EGMs in the gaming system reaches or exceeds a designated amount of coin-in (i.e., a threshold coin-in amount). Upon the amount of coin-in wagered at one or more EGMs in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the EGM, determined based on one or more side wagers placed, determined based on the player's primary game wager, determined based on time (such as the time of day) or determined based on any other suitable method or criteria.

In another alternative embodiment, a player team qualification event and/or a team benefit qualification event occurs, based on an amount of coin-out. In this embodiment, the gaming system determines if an amount of coin-out provided by one or more EGMs in the gaming system reaches or exceeds a designated amount of coin-out (i.e., a threshold coin-out amount). Upon the amount of coin-out provided at one or more EGMs in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the EGM, determined based on one or more side wagers placed, determined based on the player's primary game wager, determined based on time (such as the time of day) or determined based on any other suitable method or criteria.

In another alternative embodiment, a player team qualification event and/or a team benefit qualification event occurs, based on a predefined variable reaching a defined parameter threshold. For example, when the 500,000$^{th}$ player has played an EGM of the gaming system (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In another alternative embodiment, a player team qualification event and/or a team benefit qualification event occurs, based on a quantity of games played. In this embodiment, a quantity of games played is set for when one or more of such events or conditions will occur. In one embodiment, such a set quantity of games played is based on historic data.

In another alternative embodiment, a player team qualification event and/or a team benefit qualification event occurs, based on time. In this embodiment, a time is set for when one or more of such events or conditions will occur. In one embodiment, such a set time is based on historic data.

In another alternative embodiment, a player team qualification event and/or a team benefit qualification event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a player team qualification event and/or a team benefit qualification event occurs, based on a system determination, including one or more random selections by the central controller. In one embodiment, as described above, the central controller tracks all active EGMs and the wagers they placed. In one such embodiment, based on the EGM's state as well as one or more wager pools associated with the EGM, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a player team qualification event and/or a team benefit qualification event occurs, based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a player team qualification event and/or a team benefit qualification event to occur may be implemented in accordance with the gaming system and method disclosed herein.

It should be appreciated that any of the above-described player team qualification events and/or team benefit qualification events may be combined in one or more different embodiments.

Alternative Embodiments

It should be appreciated that in different embodiments, one or more of:

i. a formation or creation of one or more teams,
ii. a quantity of players per formed team;
iii. a maximum quantity of players permitted per team;
iv. a minimum quantity of players permitted per team;
v. any restrictions on which players may join which teams;
vi. a maximum quantity of formed teams;
vii. a quantity of teams a player may join;
viii. one or more team parameters or characteristics;
ix. a qualification condition for a player to become a member of a team;
x. a qualification condition for a player to remain a member of a team;
xi. a disqualification condition for a player to be disqualified as a member of a team;
xii. a qualification condition for a team to qualify for a team benefit;
xiii. a qualification condition for a team to remain qualified for a team benefit;
xiv. a disqualification condition for a team to be disqualified for a team benefit;
xv. which players to assign to which teams;
xvi. a quantity of team benefit(s) to utilize for a qualifying team;
xvii. which team benefit(s) to utilize for a qualifying team;
xviii. a duration to utilize one or more team benefits for a qualifying team;
xix. whether to share one or more team benefits amongst the members of a team;
xx. a portion of an team benefit to provide each member of a team;
xxi. whether to enable a player to exchange one or more obtained team benefits;
xxii. whether to enable a player to defer the use of one or more obtained team benefits;
xxiii. whether to enable a player to switch teams;
xxiv. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally; for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 2A:
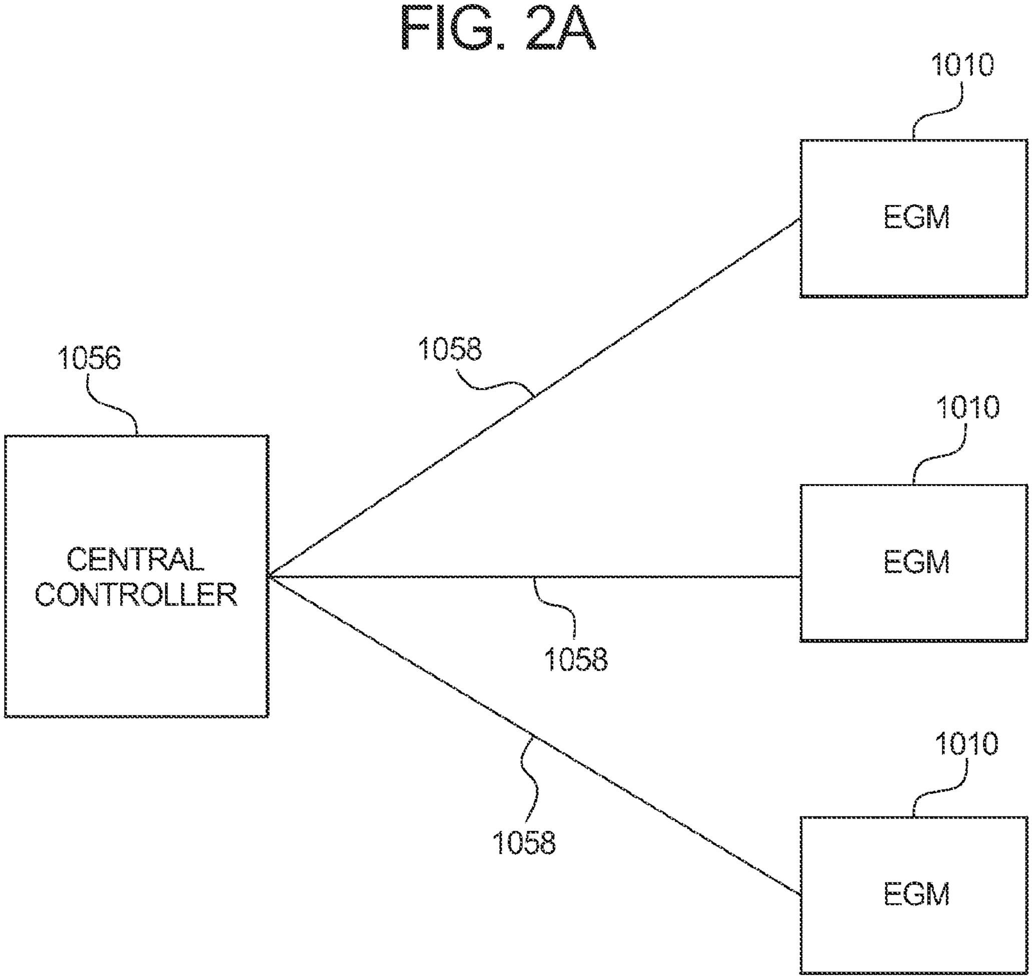
FIG. 2A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 2A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 2B:
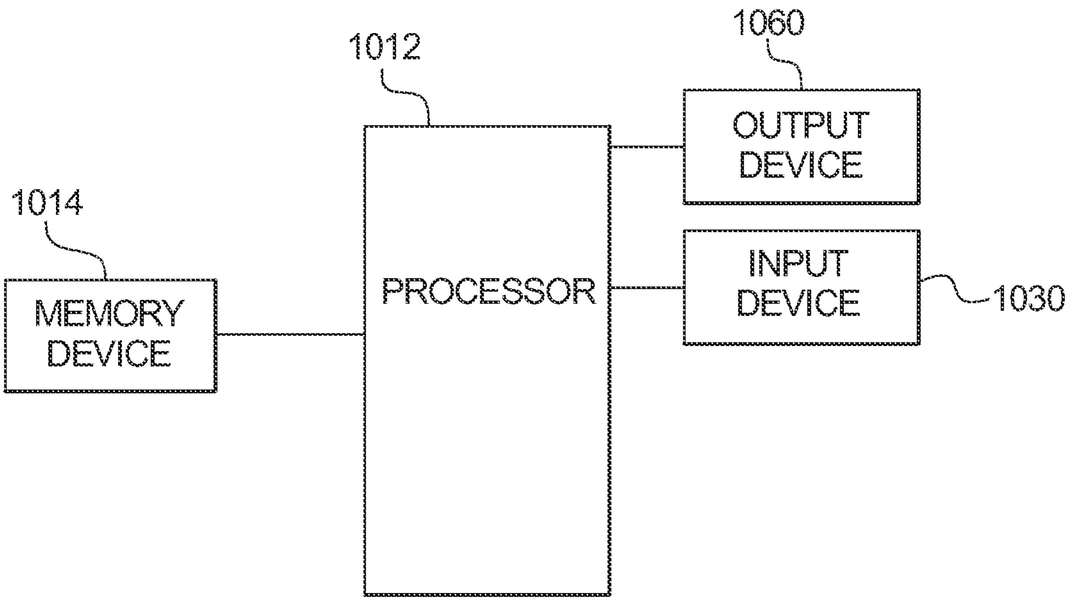
FIG. 2B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 2B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 2B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 3A:
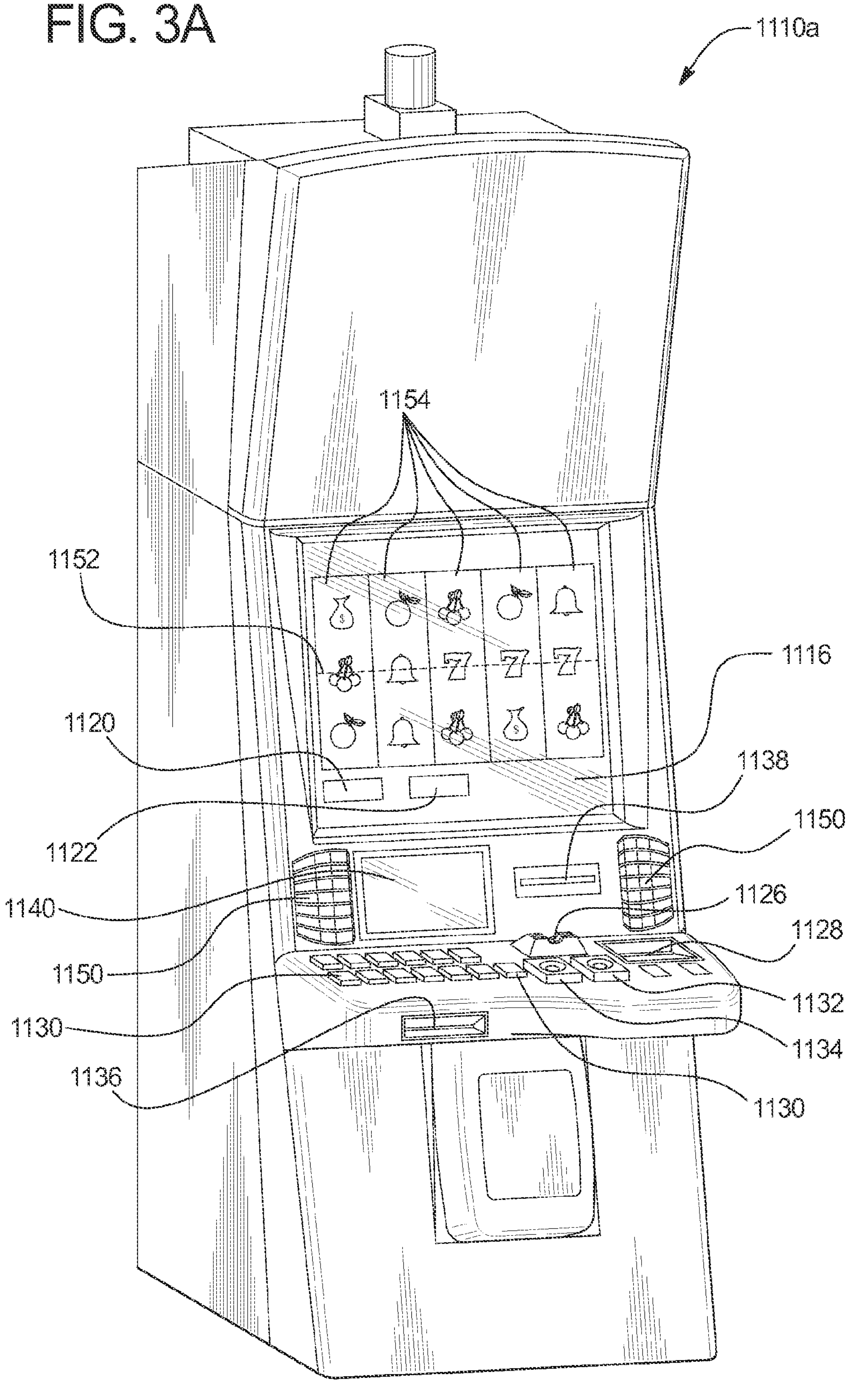
FIGS. 3A and 3B are perspective views of example alternative embodiments of the gaming system disclosed herein.

In various embodiments, the EGM includes one or more input devices. The input devices may include any suitable device that enables an input signal to be produced and received by the at least one processor of the EGM. The example EGM illustrated in FIG. 2B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 3A and 33 illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 3A and 3B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 3A and 3B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 3A and 3B each include a card reader 1138. The card reader is configured to read a player identification card inserted into the card reader.

In various embodiments, the EGM includes one or more output devices. The example EGM illustrated in FIG. 2B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 3A includes a central display device 1116, a player tracking display 1140, a credit display 1120, and a bet display 1122. The example EGM illustrated in FIG. 3B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 3A and 3B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 3A and 3B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

Figure 3B:
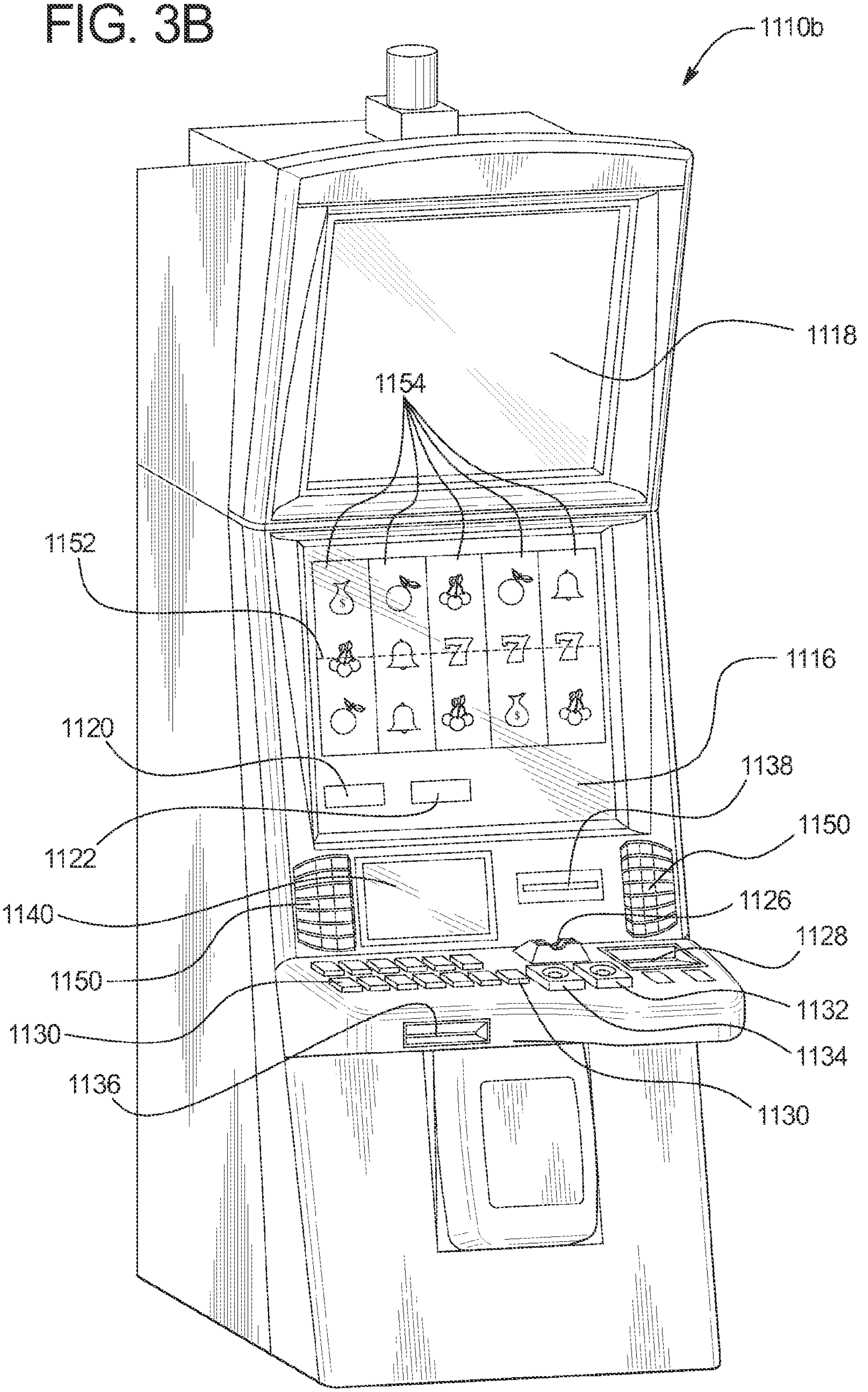

As generally described above, in certain embodiments, such as the example EGMs illustrated in FIGS. 3A and 3B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 3A and 3B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 3A and 3B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846; 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a “secondary game meter” configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple “buy-in.” For example, qualification through other specified activities is unsuccessful, payment of a fee or placement of an additional wager “buys-in” to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player’s gaming activity. In one such embodiment, the player tracking system does so through the use of player tracking cards. In this embodiment, a player is issued a player identification card that has an encoded player identification number that uniquely identifies the player. When the player’s playing tracking card is inserted into a card reader of the gaming system to begin a gaming session, the card reader reads the player identification number off the player tracking card to identify the player. The gaming system timely tracks any suitable information or data relating to the identified players gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player’s account number, the player’s card number, the player’s first name, the player’s surname, the player’s preferred name, the player’s player tracking ranking, any promotion status associated with the player’s player tracking card, the player’s address, the player’s birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a housing;

a plurality of input devices supported by the housing, said plurality of input devices including:

(i) an acceptor, and (ii) a cashout device;

at least one display device supported by the housing;

at least one processor; and at least one memory device which stores a plurality of instructions, which when executed by the at least one processor, cause the at least one processor to operate with the plurality of input devices and the at least one display device to:

(a) if a physical item is received via the acceptor, establish a credit balance based, at least in part, on a monetary value associated with the received physical item, (b) during a first period of time when a player is not associated with any teams:

(i) enable the player to place a first wager amount on a first play of a game, said first play of the game being associated with a first paytable having a first average expected payback percentage, (ii) generate a game outcome, (iii) display the generated game outcome, (iv) determine any award associated with the generated game outcome, and (v) display any determined award, (c) during a second, different period of time when the player is associated with a team:

(i) enable the player to place the first wager amount on a second play of the game, wherein independent of any player input, said second play of the game is associated, with a second, different paytable having a second, different average expected payback percentage, said second average expected payback percentage being greater than the first average expected payback percentage, (ii) generate a game outcome, (iii) display the generated game outcome, (iv) determine any award associated with the generated game outcome, and (v) display any determined award, and (d) if a cashout input is received via the cashout device, cause an initiation of any payout associated with the credit balance.

2. The gaming system of claim 1, wherein when executed by the at least one processor, the plurality of instructions cause the at least one processor to, during the first period of time when the player is not associated with any teams, enable the player to place a second wager amount on a third play of the game, said third play of the game being associated with the second, different paytable having the second, different average expected payback percentage and said second wager amount being greater than the first wager amount.

3. The gaming system of claim 1, wherein when executed by the at least one processor, the plurality of instructions cause the at least one processor to lock at least one feature associated with the game during the first period of time and unlock the at least one feature associated with the game during the second period of time.

4. The gaming system of claim 1, wherein when executed by the at least one processor, the plurality of instructions cause the at least one processor to determine if the player is associated with the team based on an amount of wagering activity of the player during a designated period of time.

5. The gaming system of claim 1, wherein when executed by the at least one processor, the plurality of instructions cause the at least one processor to determine if the player is associated with the team based on the player accepting an invitation to join the team.

6. The gaming system of claim 1, wherein at least one of any placed wager amount and any determined awards is at least one selected from the group consisting of: a quantity of monetary credits, a quantity of non-monetary credits, a quantity of promotional credits, and a quantity of player tracking points.

7. A method of operating a gaming system, said method comprising:

(a) during a first period of time when a player is not associated with any teams:

(i) enabling the player to place a first wager amount on a first play of a game, said first play of the game being associated with a first paytable having a first average expected payback percentage, (ii) causing at least one processor to execute a plurality of instructions to generate a game outcome, (iii) causing at least one display device to display the generated game outcome, (iv) causing the at least one processor to execute the plurality of instructions to determine any award associated with the generated game outcome, and (v) causing the at least one display device to display any determined award, wherein a credit balance is increasable based on any determined award, said credit balance being increasable via an acceptor of a physical item associated with a monetary value, and said credit balance being decreasable via a cashout device, and (b) during a second, different period of time when the player is associated with a team:

(i) enabling the player to place the first wager amount on a second play of the game, wherein independent of any player input, said second play of the game is associated with a second, different paytable having a second, different average expected payback percentage, said second average expected payback percentage being greater than the first average expected payback percentage, (ii) causing the at least one processor to execute the plurality of instructions to generate a game outcome, (iii) causing the at least one display device to display the generated game outcome, (iv) causing the at least one processor to execute the plurality of instructions to determine any award associated with the generated game outcome, and (v) causing the at least one display device to display any determined award, wherein the credit balance is increasable based on any determined award.

8. The method of claim 7, which includes, during the first period of time when the player is not associated with any teams, enabling the player to place a second wager amount on a third play of the game, said third play of the game being associated with the second, different paytable having the second, different average expected payback percentage and said second wager amount being greater than the first wager amount.

9. The method of claim 7, which includes causing the at least one processor to execute the plurality of instructions to lock at least one feature associated with the game during the first period of time and unlock the at least one feature associated with the game during the second period of time.

10. The method of claim 7, which includes causing the at least one processor to execute the plurality of instructions to determine if the player is associated with the team based on an amount of wagering activity of the player during a designated period of time.

11. The method of claim 7, which includes causing the at least one processor to execute the plurality of instructions to determine if the player is associated with the team based on the player accepting an invitation to join the team.

12. The method of claim 7, wherein at least one of any placed wager amount and any determined awards is at least one selected from the group consisting of: a quantity of monetary credits, a quantity of non-monetary credits, a quantity of promotional credits, and a quantity of player tracking points.

13. The method of claim 7, which is provided through a data network.

14. The method of claim 13, wherein the data network is an internet.

15. A non-transitory computer readable medium including a plurality of instructions, which when executed by at least one processor, cause the at least one processor to:

(a) during a first period of time when a player is not associated with any teams:

(i) enable the player to place a first wager amount on a first play of a game, said first play of the game being associated with a first paytable having a first average expected payback percentage, (ii) generate a game outcome, (iii) cause at least one display device to display the generated game outcome, (iv) determine any award associated with the generated game outcome, and (v) cause the at least one display device to display any determined award, wherein a credit balance is increasable based on any determined award, said credit balance being increasable via an acceptor of a physical item associated with a monetary value, and said credit balance being decreasable via a cashout device, and (b) during a second, different period of time when the player is associated with a team:

(i) enable the player to place the first wager amount on a second play of the game, wherein independent of any player input, said second play of the game is associated with a second, different paytable having a second, different average expected payback percentage, said second average expected payback percentage being greater than the first average expected payback percentage, (ii) generate a game outcome, (iii) cause the at least one display device to display the generated game outcome, (iv) determine any award associated with the generated game outcome, and (v) cause the at least one display device to display any determined award, wherein a credit balance is increasable based on any determined award.

16. The non-transitory computer readable medium of claim 15, wherein when executed by the at least one processor, the plurality of instructions cause the at least one processor to, during the first period of time when the player is not associated with any teams, enable the player to place a second wager amount on a third play of the game, said third play of the game being associated with the second, different paytable having the second, different average expected payback percentage and said second wager amount being greater than the first wager amount.

17. The non-transitory computer readable medium of claim 15, wherein when executed by the at least one processor, the plurality of instructions cause the at least one processor to lock at least one feature associated with the game during the first period of time and unlock the at least one feature associated with the game during the second period of time.

18. The non-transitory computer readable medium of claim 15, wherein when executed by the at least one processor, the plurality of instructions cause the at least one processor to determine if the player is associated with the team based on an amount of wagering activity of the player during a designated period of time.

19. The non-transitory computer readable medium of claim 15, wherein when executed by the at least one processor, the plurality of instructions cause the at least one processor to determine if the player is associated with the team based on the player accepting an invitation to join the team.

20. The non-transitory computer readable medium of claim 15, wherein at least one of any placed wager amount and any determined awards is at least one selected from the group consisting of: a quantity of monetary credits, a quantity of non-monetary credits, a quantity of promotional credits, and a quantity of player tracking points.

* * * * *